United States Patent [19]

Masunaga et al.

[11] Patent Number: 5,537,250
[45] Date of Patent: Jul. 16, 1996

[54] EQUATORIAL MOUNT FOR A BINOCULAR REFLECTING TELESCOPE

[76] Inventors: Shuichi Masunaga; Sumie Masunaga, both of 11-18, Higashihagoromo 6-chome, Takaishi-shi, Osaka, Japan

[21] Appl. No.: 423,724

[22] Filed: Apr. 18, 1995

Related U.S. Application Data

[62] Division of Ser. No. 164,452, Dec. 9, 1993.

[30] Foreign Application Priority Data

Dec. 10, 1992 [JP] Japan ................................ 4-330598

[51] Int. Cl.$^6$ ........................... G02B 23/00; E04G 3/00
[52] U.S. Cl. .................... 359/430; 359/399; 248/280.11
[58] Field of Search .......................... 359/399, 429–430; 248/122, 123.1, 124, 178, 162.1, 186, 280.1, 281.1; 434/284, 285, 289; 33/299

[56] References Cited

U.S. PATENT DOCUMENTS

| 2,711,589 | 6/1955 | Stock | 359/430 |
| 3,840,284 | 10/1974 | Rand | 359/430 |
| 5,332,181 | 7/1994 | Schweizer et al. | 248/280.1 |
| 5,437,427 | 8/1995 | Johnson | 248/286 |

FOREIGN PATENT DOCUMENTS

| 23003 | 1/1981 | European Pat. Off. | 248/281.1 |

*Primary Examiner*—Thong Q. Nguyen
*Attorney, Agent, or Firm*—Wenderoth, Lind & Ponack

[57] ABSTRACT

An equatorial mount for supporting a binocular reflecting telescope having two Cassegrain or Schmidt-Cassegrain reflecting mirror units having the same aperture and the same focal length. The equatorial mount includes a pedestal, a polar shaft (first shaft) supported obliquely by the pedestal. A second shaft is rotatably supported in a support barrel coupled to the polar shaft. A third shaft is rotatably supported in a second support barrel provided at the bottom end of the first support barrel. Counterweights are screwed onto a threaded rod so as to extend from the free end of a V-shaped crank which is mounted on the free end of the second shaft. Another counterweight is screwed onto another threaded rod mounted inside of the crank and extends in the same direction as the crank. The equatorial mount has a greater degree of freedom of rotation compared with a German-style equatorial mount, because it has the third shaft.

3 Claims, 17 Drawing Sheets

EQUATORIAL MOUNT FOR A BINOCULAR REFLECTING TELESCOPE

This is a divisional application of Ser. No. 08/164,452, filed Dec. 9, 1993.

BACKGROUND OF THE INVENTION

This invention relates to a binocular reflecting telescope which is a variant of a Cassegrain or Schmidt-Cassegrain reflector and an equatorial mount for supporting the same.

As a conventional astronomical binocular, there is known a right-angle view refracting binocular as shown in FIGS. 22, 23. It uses a roof (Amici) prism 102 and a parallelogrammic prism 103. The light beam from an objective lens 101 is reflected by the roof (Amici) prism 102 at points P1 and P2 and guided to an eyepiece 104 through a parallelogrammic prism 103.

Another type of conventional binocular is shown in FIG. 24, which is a Cassegrain reflector. This reflecting telescope comprise a Cassegrain telescope tube housing primary mirrors 110, 110' having small holes 111, 111' and secondary mirrors 112, 112' and Porro prisms 113, 113' combined with the telescope tube. The light reflected by the primary mirrors 110, 110' is reflected again by the secondary mirrors 112, 112' for condensing, passed thorough the small holes 111, 111' reflected by the Porro prisms 113, 113' and guided to eyepieces 114, 114'.

Such binoculars have to be supported on a rather large equatorial mount if they are large-apertured ("large" usually means more than 500 mm). An equatorial mount generally has a telescope tube rotating device mounted on one end of a declination shaft so as to be rotatable about a polar axis to rotatably support such a binocular.

But, with the binoculars using a roof (Amici) prism or a Porro prism, the back focus behind the primary mirror has to be considerably long corresponding to the length of the prism light path. Thus, they tend to be long in the focal length and narrow in the visual field.

Another problem is that the eye-pieces are rotated as the telescope is turned. This means that when mounted on an equatorial mount, as the telescope is turned following the diurnal motion of a heavenly body, an observer is forced to incline his head and take an unnatural body position.

Further, a conventional equatorial mount having a telescope tube rotating device tends to be large in size and heavy, so that it is difficult to operate, and is also expensive.

An object of this invention is to provide a binocular reflecting telescope which may be applied to small-apertured or large-apertured telescopes, which has a short focus and thus a short primary telescope tube even if it has a large aperture, which has a bright and wide visual field and is compact in size and inexpensive and which has rotatable eye-pieces so that an observer does not have to incline his head while observing.

Another object is to provide an equatorial mount, for supporting the above-described telescope, which has a greater degree of freedom of rotation than a conventional German style equatorial mount and which is sufficiently light in the total weight including the counterweights for keeping the weight balanced and thus is inexpensive and easy to operate.

SUMMARY OF THE INVENTION

In order to solve the above problems, there is provided a binocular reflecting telescope comprising two Cassegrain or Schmidt-Cassegrain reflecting mirror units having the same aperture and the same focal length and each comprising a concave primary mirror and a convex secondary mirror provided opposite to each other along each of two parallel first optical axes, two erect real image forming means each comprising a combination of plane mirrors for guiding a ray of light out of the first optical axis from a point between the primary mirror and the secondary mirror, and two eyepiece units rotatable about the optical axes of the light rays guided out of the first optical axes.

Each erect real image forming means comprises a third mirror and a fourth mirror in the form of plane mirrors for reflecting the light or light beam reflected by the corresponding secondary mirror. The third mirror is disposed along the first optical axis between the primary mirror and the secondary mirror. The fourth mirror is disposed along a second optical axis of the light reflected by the third mirror so as to be spaced apart a predetermined distance from the third mirror. The third mirror and the fourth mirror are arranged such that a plane including the third mirror and a plane including the fourth mirror intersects with each other at a right angle. The line of intersection between these two planes forming an angle of θ/2 with respect to the first optical axis, wherein θ is the angle between a third optical axis of the light reflected by the fourth mirror and the first optical axis.

One of the primary and secondary reflecting mirror units is provided longitudinally displaced by a predetermined distance from the other so that the third optical axes, obtained by the erect real image forming means, are located near an intermediate point between the first optical axes. Further, a line connecting right and left optical axes of the third optical axes may be arranged so as to intersect with the first optical axes at a right angle.

Also, each eyepiece unit comprises a tumbler rotatable about the third optical axis or an optical axis corresponding thereto, a pair of parallel plane mirrors mounted in the tumbler, and an eyepiece lens for receiving the light reflected by the pair of plane mirrors.

Further, as a mount for supporting any of the above-described binocular reflecting telescopes, there is provided an equatorial mount.

With the binocular reflecting telescope according to the first embodiment, the light emitted from afar and coming into the front end of each primary barrel is reflected by the concave and convex surfaces of the primary mirror and the secondary mirror. The light thus reflected represents an inverted image. The inverted image light is guided out of the first optical axis at a position between the secondary mirror and the primary mirror by the erect real image forming means.

An inverted image is converted into an erect image by the erect real image forming means, which comprises a combination of plane mirrors. The real image light thus produced is observed through the eye-piece mechanism. The eyepiece mechanism is rotatable about the optical axis of the erect image light. Thus, in tracking an object to be observed by rotating the equatorial supporting the binocular reflecting telescope, the observer does not have to incline his head but can keep his upright position irrespective of the angle of the binocular reflecting telescope with respect to the equatorial. The plane mirrors used in the present invention may be mirrors having plane surfaces and prism mirrors having the same function as plane mirrors.

The erect real image forming means comprises the third mirror and the fourth mirror. In order to obtain an erect real image, the two mirrors are spaced apart a predetermined distance from each other and arranged perpendicular to each other so that the angle between the first optical axis and the imaginary line of intersection between the two plane mirrors will be θ/2, wherein θ is the angle between the third optical axis and the first optical axis.

Now referring to FIG. 21, description will be made about the method of obtaining an erect real image. In the following description, the term "vector" refers to "unit vector".

Considering the inclination of an image obtained by a combination of plane reflecting mirrors is basically the same as considering its mirror image. The difference in three-dimensional positions among the mirrors does not matter because it is possible to assume that all the intersecting points between the optical axes and the mirror surfaces are on the origin of the coordinate.

Generally, a mirror image can be expressed in a matrix. Also, a mirror image with respect to a reflecting surface in a given position is obtainable by turning the coordinate system and, as is well-known, it is expressed by the following formula:

$$S' = RS \tag{1}$$

wherein S is the directional vector of the object being observed, S' is the directional vector of the image reflected by a plane mirror and R is the matrix of the mirror image. The matrix R can be expressed by l, m and n which are the x, y and z components of the normal vector of the plane mirror as follows:

$$R = \begin{pmatrix} 1-2l^2 & -2lm & -2ln \\ -2lm & 1-2m^2 & -2mn \\ -2ln & -2mn & 1-2n^2 \end{pmatrix}. \tag{2}$$

An erect image can be inferred by applying the above relational expressions to the optical system of the present invention. As shown in FIG. 21A, an optical image reflected by the primary and secondary mirrors M1 and M2 would be formed on the first optical axis as an inverted image S, if it were not for the third mirror M3 and if the primary mirror M1 had a small hole. By the provision of the third mirror M3 and fourth mirror M4, the otherwise inverted image can be converted to an erect real image S' (M4 is placed on the origin at the position of M3).

This means that the erect real image is formed along line P that forms an angle θ with respect to the x-axis in the xy-plane. Such an erect image can be formed by rotating the inverted image S by 180° about the x-axis and then by rotating it by an angle θ about the z-axis. This is expressed by the following matrix:

$$S' = \begin{pmatrix} \cos\theta & -\sin\theta & 0 \\ \sin\theta & \cos\theta & 0 \\ 0 & 0 & 1 \end{pmatrix} \begin{pmatrix} 1 & 0 & 0 \\ 0 & \cos 180° & -\sin 180° \\ 0 & \sin 180° & \cos 180° \end{pmatrix} S \tag{3}$$

$$= \begin{pmatrix} \cos\theta & \sin\theta & 0 \\ \sin\theta & -\cos\theta & 0 \\ 0 & 0 & -1 \end{pmatrix} S$$

If such a mirror assembly comprises a number (N) of plane mirrors, the reflected image S' of an object S is expressed by the product of the mirror image matrixes RN RN-1 ... R2 R1:

$$S' = RN \ldots R2\, R1\, S \tag{4}$$

The matrix RN is obtained simply by substituting RN for the mirror image matrix R.

In this invention, two plane mirrors M3, M4 are used to produce an erect image. Namely, the real image is expressed by the following formula:

$$S' = R2\, R1\, S = Rw\, S \tag{5}$$

wherein R2 and R1 are the mirror image matrixes by the respective plane mirrors. The two matrixes R2 and R1 can be combined into a single matrix Rw having the following matrix components.

$$Rw = \tag{6}$$

$$\begin{pmatrix} 1-2(1-\alpha^2)\sin^2\omega & 2\sin\omega(-\gamma\cos\omega + \alpha\beta\sin\omega) & 2\sin\omega(\beta\cos\omega + \alpha\gamma\sin\omega) \\ 2\sin\omega(\gamma\cos\omega + \alpha\beta\sin\omega) & 1-2(1-\beta^2)\sin^2\omega & 2\sin\omega(-\alpha\cos\omega + \beta\gamma\sin\omega) \\ 2\sin\omega(-\beta\cos\omega + \alpha\gamma\sin\omega) & 2\sin\omega(\alpha\cos\omega + \beta\gamma\sin\omega) & 1-2(1-\gamma^2)\sin^2\omega \end{pmatrix}$$

wherein the components ($\alpha$, $\beta$, $\gamma$) of the matrix R are the support barrel 3a. Though not shown, the support barrel 3a x, y and z components of the vector V of the intersecting line between the two plane mirrors and ω is the intersecting angle between the two plane mirrors. The vector of the intersecting line between the plane mirrors is a vector that extends along the intersecting line between the two plan mirrors if they were imaginarily brought together so as to intersect with each other at the common center.

Now let us compare formulas (6) and (3). If the following relations are satisfied, formula (6) coincides with formula (3):

$$V = \begin{pmatrix} \alpha \\ \beta \\ \gamma \end{pmatrix} = \begin{pmatrix} \cos\frac{\theta}{2} \\ \sin\frac{\theta}{2} \\ 0 \end{pmatrix} \tag{7}$$

$$\omega = 90°$$

Namely, an erect image is obtainable by arranging the two mirrors M3, M4 so that they will intersect with each other at a right angle and the angles of the incoming light beam and the outgoing light beam with respect to the intersecting line between the plane mirrors will be equal to each other.

In this case, the vector V0 of the intersecting line (ω=90°) forms an angle θ/2 with respect to the first optical axis and the outgoing light beam.

If the angle between the third optical axis and the first optical axis, defined generally as θ above, is 45°, 60°, 90° and 120°, the components (l, m, n) of the normal line vectors Q3, Q4 of the plane mirrors M3, M4 will be as shown in the Table 1:

|   | Combination No. | | | | | |
| --- | --- | --- | --- | --- | --- | --- |
|   | 1 | 2 | 3 | 4 | 5 | 6 |
|   | θ | | | | | |
|   | 45 | 60 | 90 | 90 | 120 | 120 |
| H | | | | | | |
| $\alpha_2$ | 0.8536 | 0.75 | 0.5 | 0.25 | 0.25 | −0.125 |
| $\beta_2$ | 0.3536 | 0.4330 | 0.5 | 0.75 | 0.4330 | 0.6495 |
| $\gamma_2$ | −0.3827 | −0.5 | −0.7071 | −0.6124 | −0.8660 | −0.75 |

-continued

| | Combination No. | | | | | |
|---|---|---|---|---|---|---|
| | 1 | 2 | 3 | 4 | 5 | 6 |
| | | | θ | | | |
| | 45 | 60 | 90 | 90 | 120 | 120 |
| $Q_3$ | | | | | | |
| $\phi_3$ | 74.3002 | 69.2952 | 60.0 | 52.2388 | 52.2388 | 41.4096 |
| $l_3$ | −0.2706 | −0.3536 | −0.5 | −0.6124 | −0.6123 | −0.75 |
| $m_3$ | 0.6533 | 0.6124 | 0.5 | 0.6124 | 0.3536 | 0.433 |
| $n_3$ | −0.7071 | −0.7071 | −0.7071 | −0.5 | −0.7071 | −0.5 |
| $Q_4$ | | | | | | |
| $\phi_4$ | 74.3002 | 69.2952 | 60.0 | 69.2952 | 52.2388 | 64.3411 |
| $l_4$ | −0.2706 | −0.3536 | −0.5 | −0.3536 | −0.6123 | −0.433 |
| $m_4$ | 0.6533 | 0.6124 | 0.5 | 0.3536 | 0.3536 | 0.25 |
| $n_4$ | 0.7071 | 0.7071 | 0.7071 | 0.866 | 0.7071 | 0.866 |

In the above table, H designates vector in the direction of the second optical axis. $\phi_3$ and $\phi_4$ are incident angles of the primary light beam with respect to M3 and M4. In the combination Nos. 1–3 and 5 in the table, the incident angles $\phi_3$ and $\phi_4$ are equal to each other, i.e. $\phi_3 = \phi_4$, while in the combination Nos. 4 and 6, the incident angles are not equal.

From the above discussion it will be apparent that θ is variable.

The optical image of the erect real image, which has been reflected by the fourth mirror, is guided to the eyepiece mechanism. In assembling the eyepieces, it is necessary that the distance between the eyepieces coincide with the average interpupillary distance, which is 62 mm, no matter how large the binocular reflecting telescope is. For this purpose, it is necessary that the rays of light deflected from the right and left primary optical axes by the third and fourth mirrors be guided close to each other. For this purpose, the distance between the two third axes has to be kept at a predetermined value.

In order to achieve such predetermined distance between the third axes, in a third aspect of the invention, the reflecting mirror assemblies on the right and left, each comprising a primary mirror and a secondary mirror, are displaced from each other so that the respective third optical axes are located in a plane that lies substantially halfway between the first optical axes.

In this case, however, since the two third optical axes are located in front and rear of the aforementioned plane, an optical image is guided to the horizontal eyepieces through an eyepiece mechanism which is rotatable about the third axes.

Generally, the fourth mirrors are positioned such that the third optical axes make an angle θ with the first optical axes. Thus, the third axes on the right and left have different optical path lengths. But the total optical path length from the primary mirror to the eyepiece on one side has to be equal to that on the other side. In order to compensate for the difference in optical path lengths between the right and left third optical axes, the distances between the primary mirrors and the secondary mirrors on the respective sides are different from each other. In the specific situation wherein the angle θ is 90°, the third optical axes on both sides are equal to each other.

As another means for achieving the predetermined distance between the third optical axes, in a fourth aspect of the invention, they are arranged on both sides of and perpendicular to the first optical axes. This arrangement is applicable to a large-apertured binocular reflecting telescope. The third optical axes on both sides are of the same length. Since the distance between the two third optical axes can be widened sufficiently compared with the interpupillary distance, the reflecting mirror assemblies on both sides, each comprising a primary mirror and a secondary mirror, do not have to be displaced from each other. Thus, they are arranged parallel to each other.

As still another method of achieving the predetermined distance between the third optical axes, in a fifth aspect of the invention, a third mirror and a fourth mirror are provided so as to be arranged at 90° with respect the mirror assembly on one side, comprising a primary mirror and a secondary mirror, whereas a roof (Amici) prism is used for the other mirror assembly to guide its output optical axis in parallel with the third axis on the one side. Thus, in this case, the line connecting the third optical axis with the output optical axis of the roof (Amici) prism extends perpendicular to the first optical axis.

In the eyepiece mechanism according to sixth aspect of the invention, the lights from the primary telescope tubes are reflected by the parallel plane mirrors mounted in the tumblers, which are rotatable about the third optical axes. Thus, the eyepieces can be kept horizontal irrespective of the angle of the primary telescope tubes with respect to the line connecting the pupils of the observer. Also, since the tumblers are journaled on ring-shaped bearings and journal plates supporting their backs so as to be rotatable with respect to the fixed barrels, the total length of the optical axis is short and the optical system is compact.

Any of the telescopes according to the present invention can be supported on a mount according to the present invention. This mount has three rotary shafts, i.e. the polar shaft, second shaft and third shaft, to rotate the binocular reflecting telescope mounted thereon. The combination of the three shafts makes it possible to observe any direction in the celestial globe.

With the binocular reflecting telescope according to the present invention, light is guided out of the primary optical axis from the point between the primary mirror and the secondary mirror and the inverted image is converted into an erect real image by means of the erect real image forming means. The erect image thus obtained is viewed through the rotatable eyepiece mechanism. This makes it possible to shorten the distance from the secondary mirror to the focal point and thus to provide a wide-angled and short-focus telescope irrespective of its aperture size. Such a binocular reflecting telescope is simple in structure and inexpensive and allows an operator to observe celestial bodies without inclining his head or body.

The mount according to the present invention is used to support the above-described binocular reflecting telescopes. It has three rotary shafts combined together so that the telescope mounted thereon can be turned to any direction of the celestial globe, while keeping the primary telescope tubes so that the eyepieces are kept horizontal to the observer's eyes. The mount and the telescope form an observing device which is low-cost and very easy to operate.

Other features and objects of the present invention will become apparent from the following description made with reference to the accompanying drawings, in which:

DETAILED DESCRIPTION OF THE PREFERRED EMBODIMENT

Now we will describe embodiments of the present invention with reference to the drawings.

Figure 1:
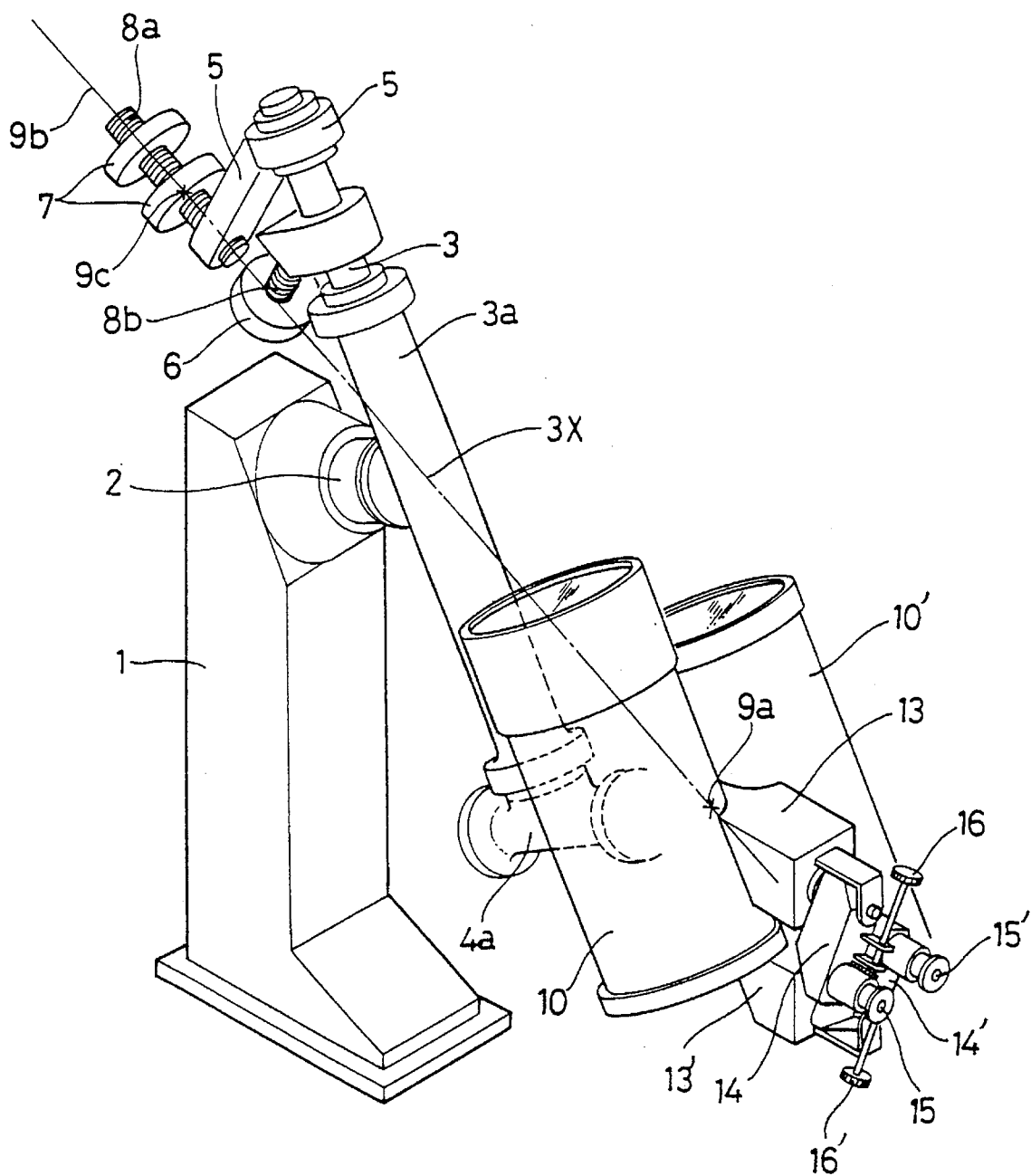
FIG. 1 is a perspective view of the entire binocular reflecting telescope of the first embodiment as mounted on an equatorial mount.

FIG. 1 is a perspective view of the first embodiment of binocular reflecting telescope mounted on an equatorial mount. We shall show various embodiments of the binocular reflecting telescope and all of them are supported on an equatorial mount of the illustrated type. Except for the first embodiment, such an equatorial mount is not shown for simplicity. The equatorial mount will be described after the description of the first embodiment.

(First Embodiment)

We will now describe the first embodiment of binocular reflecting telescope with reference to FIGS. 1–7.

Numerals 10 and 10' designate primary telescope tubes. The one on the left of FIG. 1 is designated hereinafter as a first primary telescope tube 10 and the one on the right is designated as a second primary telescope tube 10'. The first and second primary telescope tubes 10, 10' are longitudinally offset by a predetermined distance from each other and contain primary mirrors 11, 11' and secondary mirrors 12, 12'.

Figure 2:
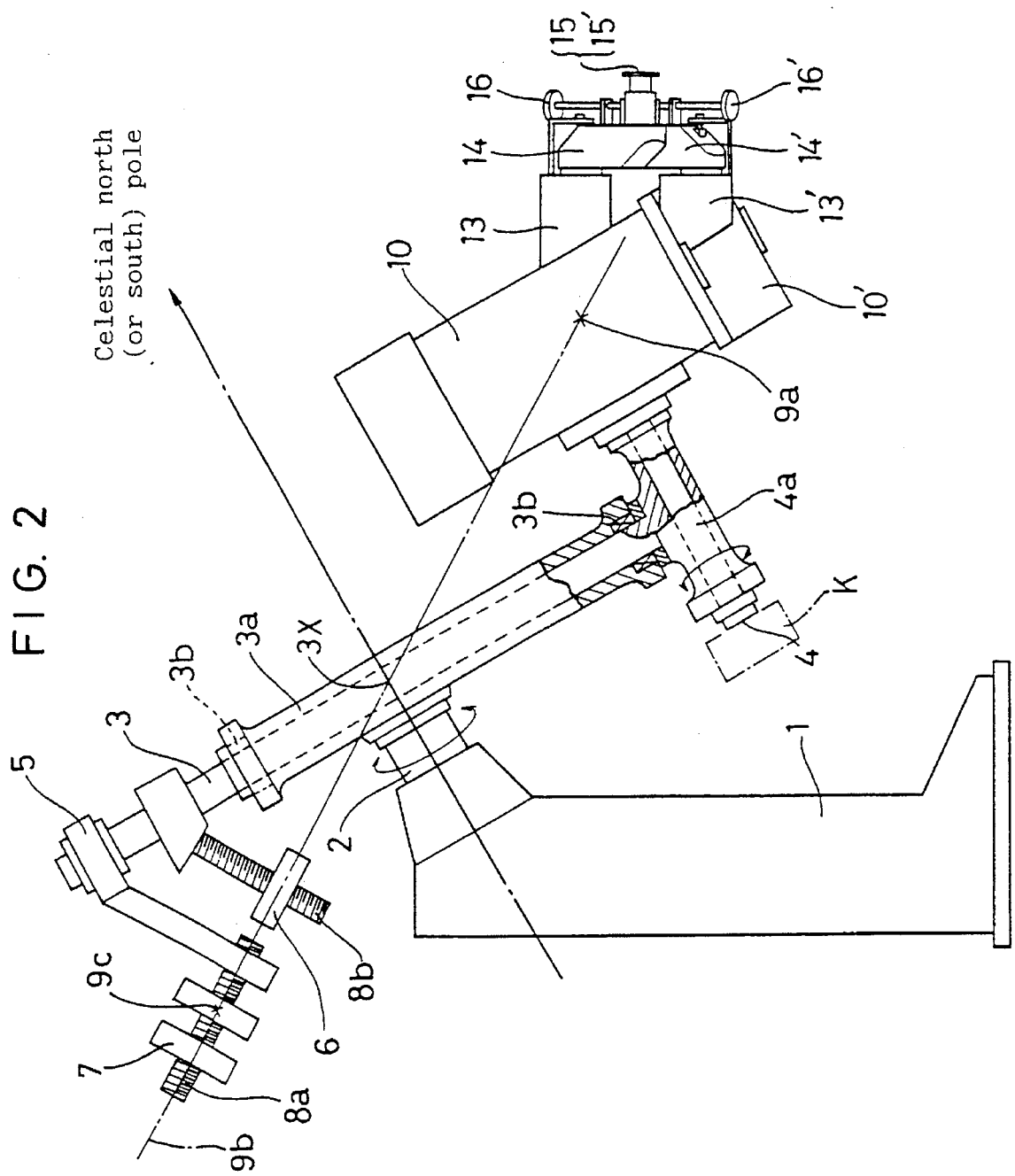
FIG. 2 is a side view of the same.
Figure 3:
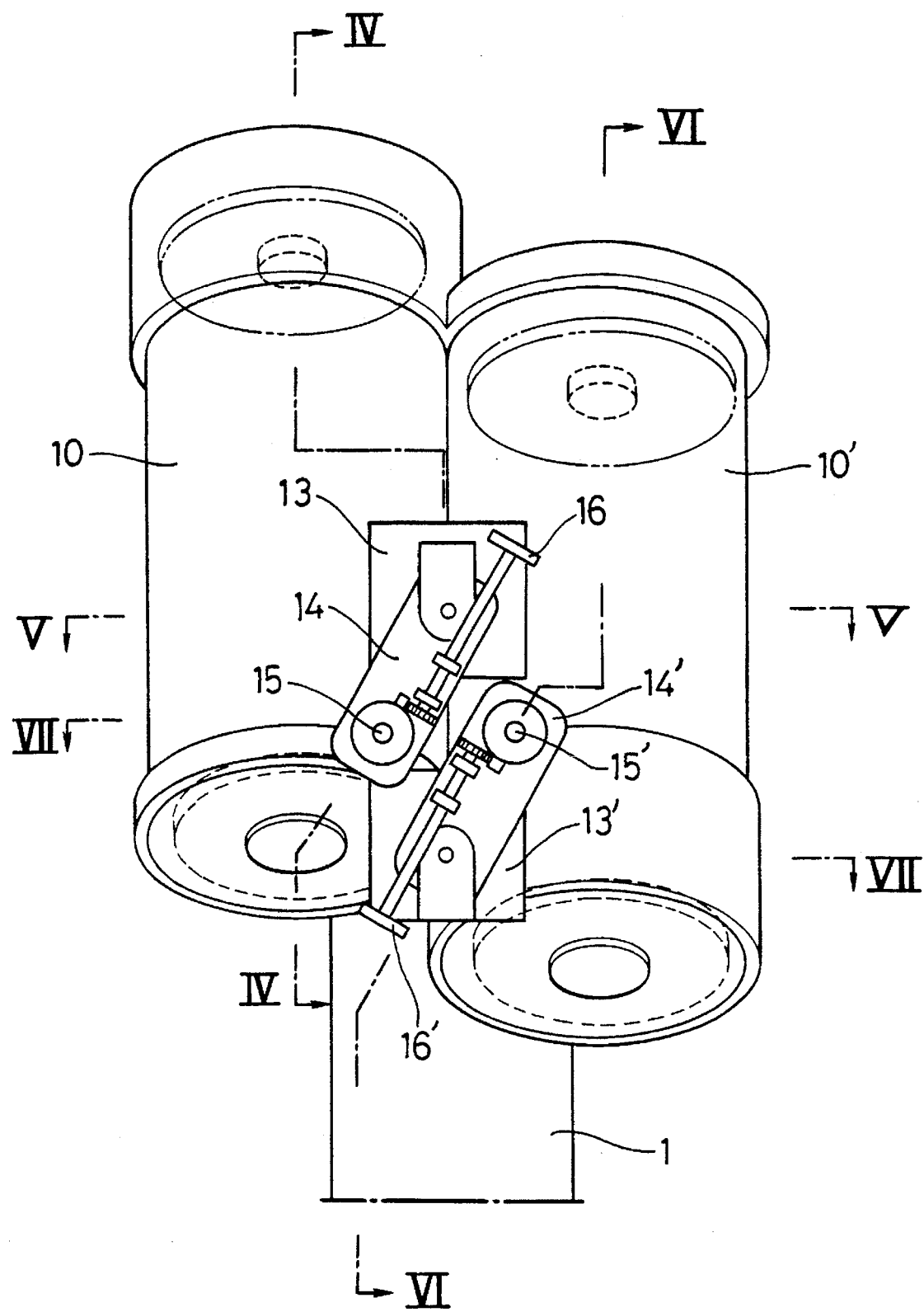
FIG. 3 is a front view of the same (but the equatorial mount omitted)

Fixed barrels 13, 13' are mounted in the joint area between the first and second primary telescope tubes 10, 10' so as to be aligned with each other as viewed from front (FIG. 3). The lights reflected by the primary mirrors 11, 11' and the secondary mirrors 12, 12' are guided out of the main optical axis through the fixed barrels 13, 13'. Further, tumblers 14, 14' and eye-pieces 15, 15' are connected. Numerals 16, 16' designate dials for fine focus adjustment. FIGS. 2 and 3 are their side view and front view, respectively.

Figure 4:
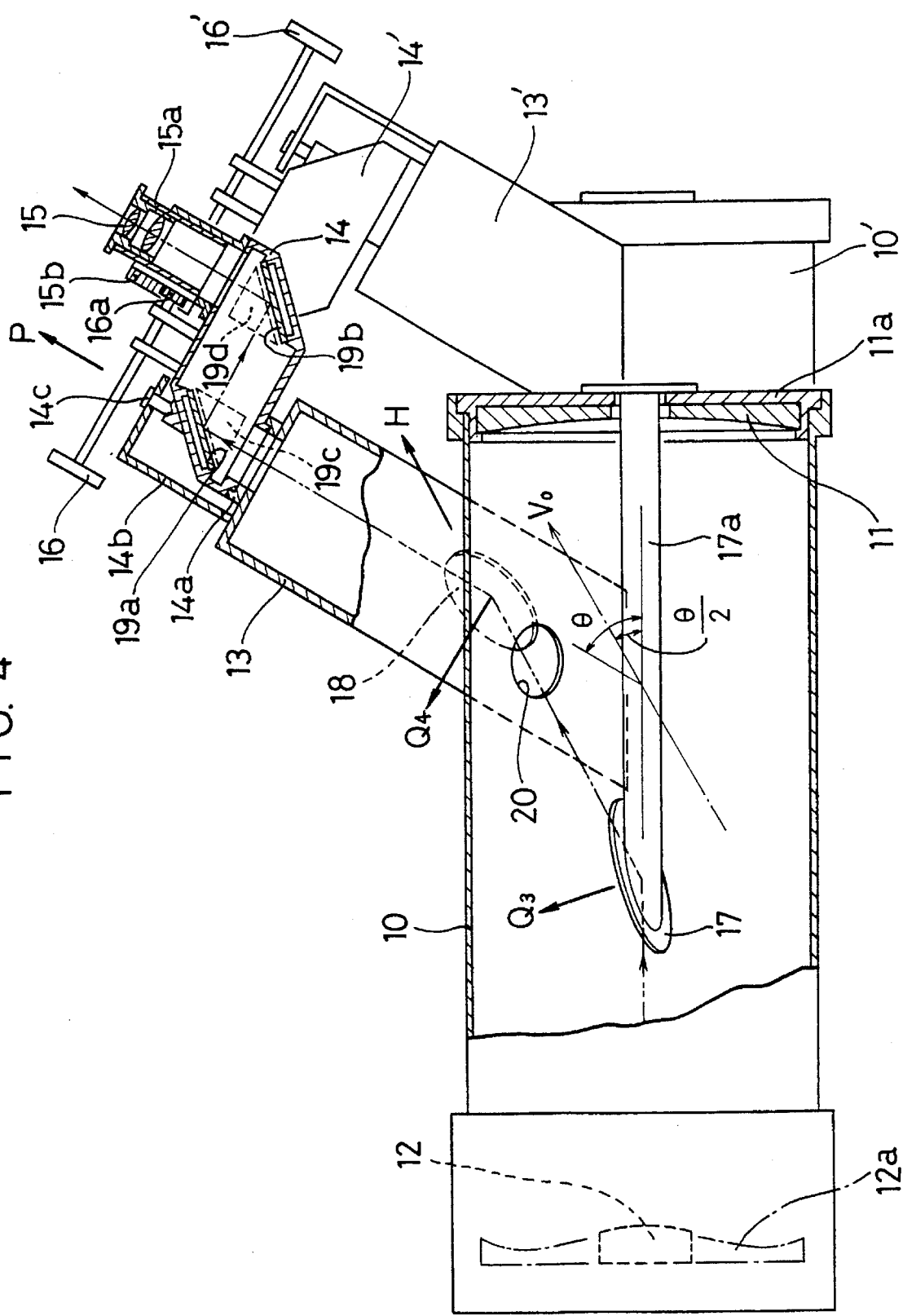
FIG. 4 is a sectional view taken along line IV—IV of FIG. 3.

FIG. 4 is a sectional view taken along line IV—IV of FIG. 3. It shows the internal structure of the binocular reflecting telescope which is associated with the first primary telescope tube 10. The following description will be made mainly for the first primary telescope tube 10. As to the second primary telescope tube 10', description will be made of only parts which are different from those of the first primary telescope tube 10.

The primary mirror 11 and the secondary mirror 12 are mounted in the first primary telescope tube 10. In the Schmidt-Cassegrain type, it is necessary that the primary mirror 11 have a spherical surface, the secondary mirror 12 have a hyperboloidal surface and a correcting plate 12a be in the form of a high-order aspherical lens (shown by chain line). In the Cassegrain type, the correcting plate 12a is not used, the primary mirror 11 has a paraboloidal or ellipsoidal surface and the secondary mirror 12 has a hyperboloidal or spherical surface. The primary mirror 11 is mounted on one end of the telescope tube by means of a primary mirror cell 11a.

Figure 5:
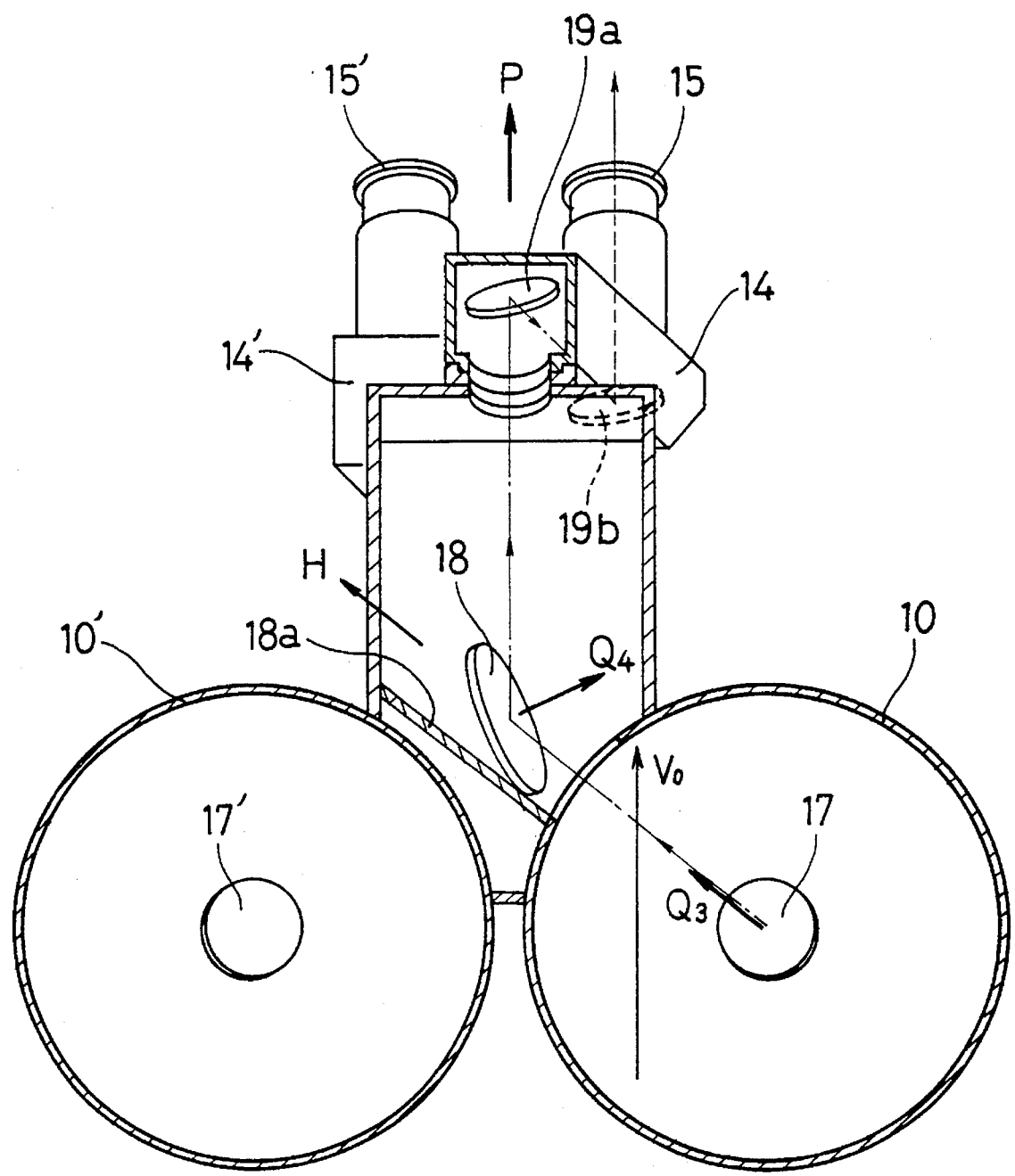
FIG. 5 is a sectional view taken along line V—V of FIG. 3.

A third mirror 17 and a fourth mirror 18, which are elliptically shaped plane mirrors, are mounted in the first primary telescope tube 10 at substantially the central part thereof and in the fixed barrel 13, respectively. In this embodiment, these two plane mirrors serve as a means for forming an erect real image. The third mirror 17 is supported on a support member 17a extending from the primary mirror cell 11a along a first optical axis (FIG. 4) while the fourth mirror 18 is supported on an oblique support plate 18a mounted in the fixed barrel 13 (FIG. 5). The third mirror 17 and the fourth mirror 18 are arranged in planes which are perpendicular to each other so as to contain a line of intersection extending in the direction of vector V0 (FIG. 5).

In the tumbler 14 mounted on the top end of the fixed barrel 13 are mounted a pair of parallel mirrors 19a, 19b (FIG. 4). An elliptical hole 20 is formed in the primary telescope tube 10.

The tumbler 14 is mounted by means of a flanged pedestal 14a and a pin 14c having its axis aligned with a third optical axis in the fixed barrel 13 so as to be rotatable with respect to the fixed barrel 13 around the third optical axis. The flanged pedestal 14a is journaled on a ring-shaped bearing. Its opening serves as an entrance port for the light guided from the fixed barrel 13. The pin 14c is provided on a support plate 14b mounted on the fixed barrel 13. The above-described rotary support mechanism can minimize the length of the third optical axis in the fixed barrel 13.

The light along the third optical axis is reflected by the parallel mirrors 19a, 19b and guided to the eye-piece 15, which has a focus adjustment mechanism comprising a dial 16 provided at its tip with a pinion 16a in engagement with a rack 15b mounted on an eye-piece barrel 15a. For focusing, the eye-piece 15 is moved up and down by turning the dial 16 manually. The parallel mirrors 19a, 19b shown in FIGS. 4 and 6 may be replaced with rectangular prisms 19c, 19d shown by dotted lines.

Figure 21A:
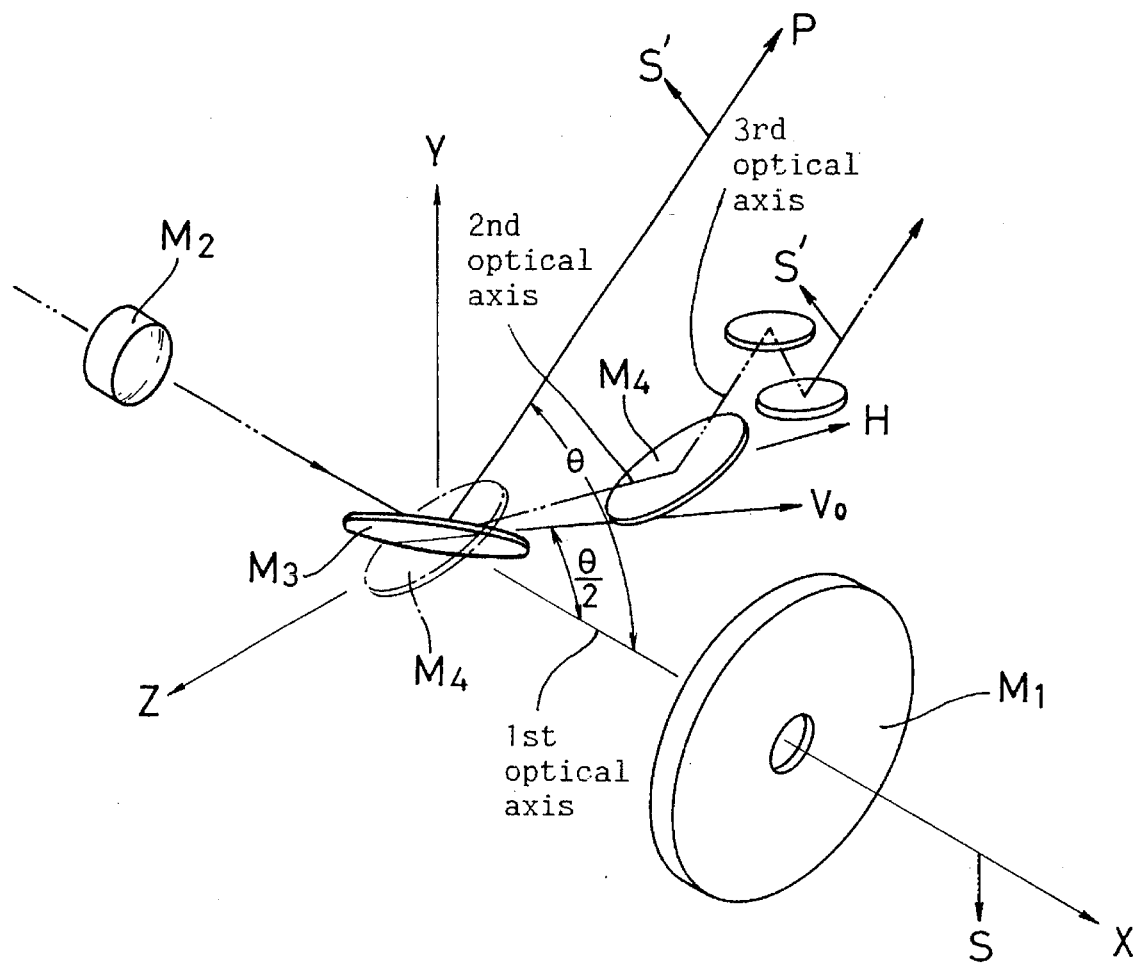
FIGS. 21A and 21B are explanatory views of the relative orientation of the erect real image forming means.
Figure 21B:
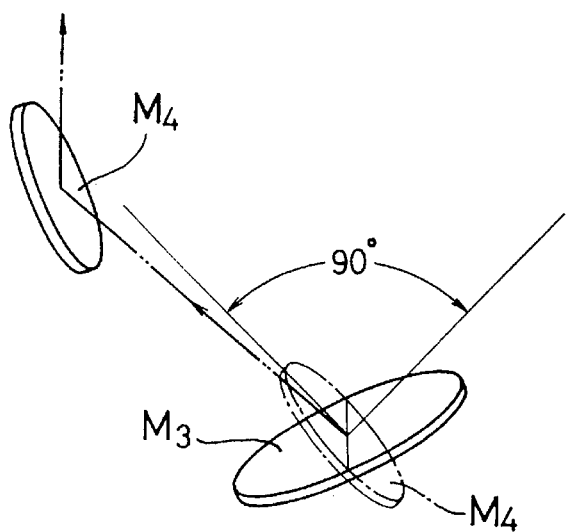
Figure 22:
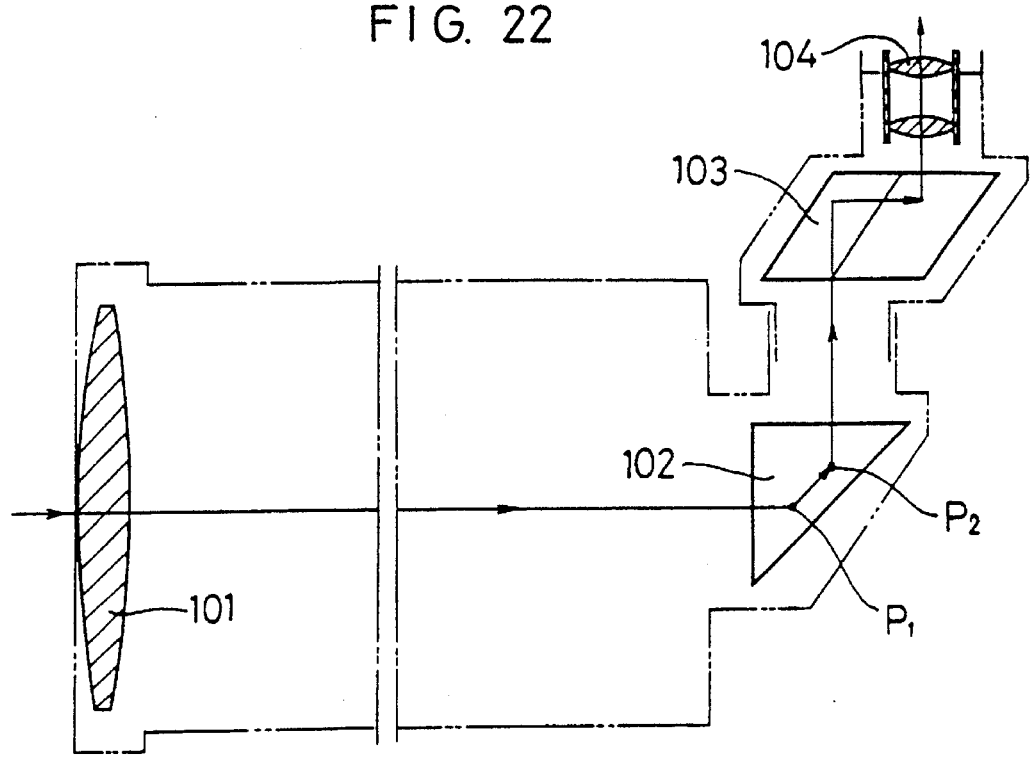
FIG. 22 is a vertical sectional view of a conventional binocular.
Figure 23:
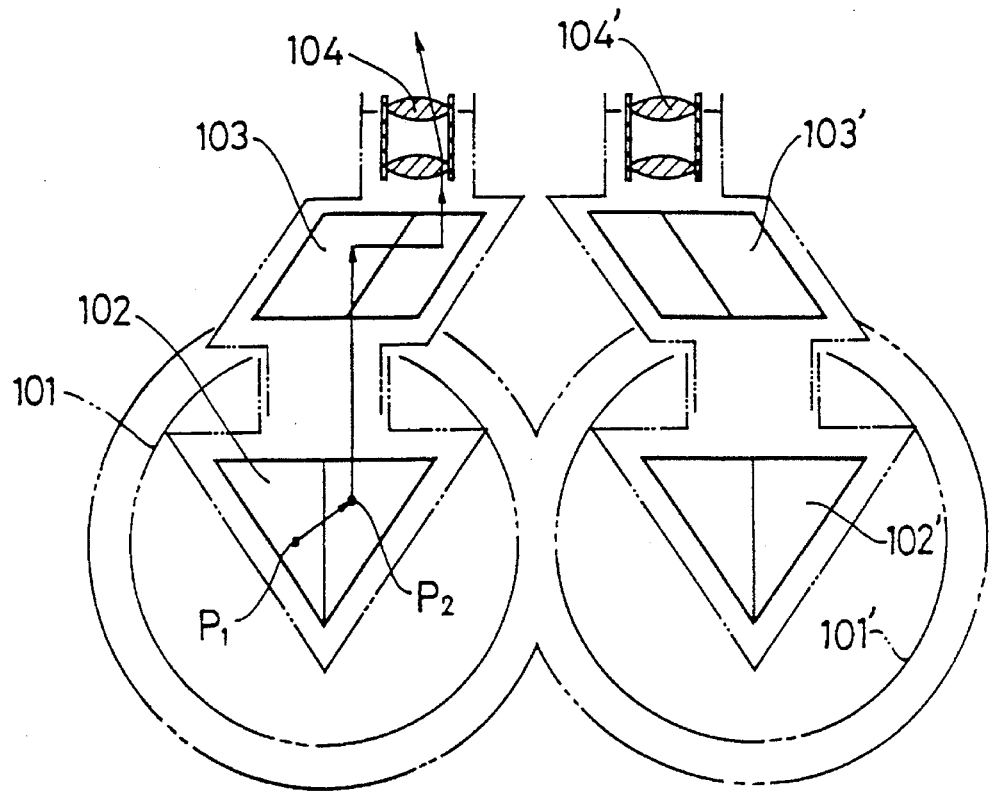
FIG. 23 is another vertical sectional view of the conventional binocular illustrated in FIG. 22.
Figure 24:
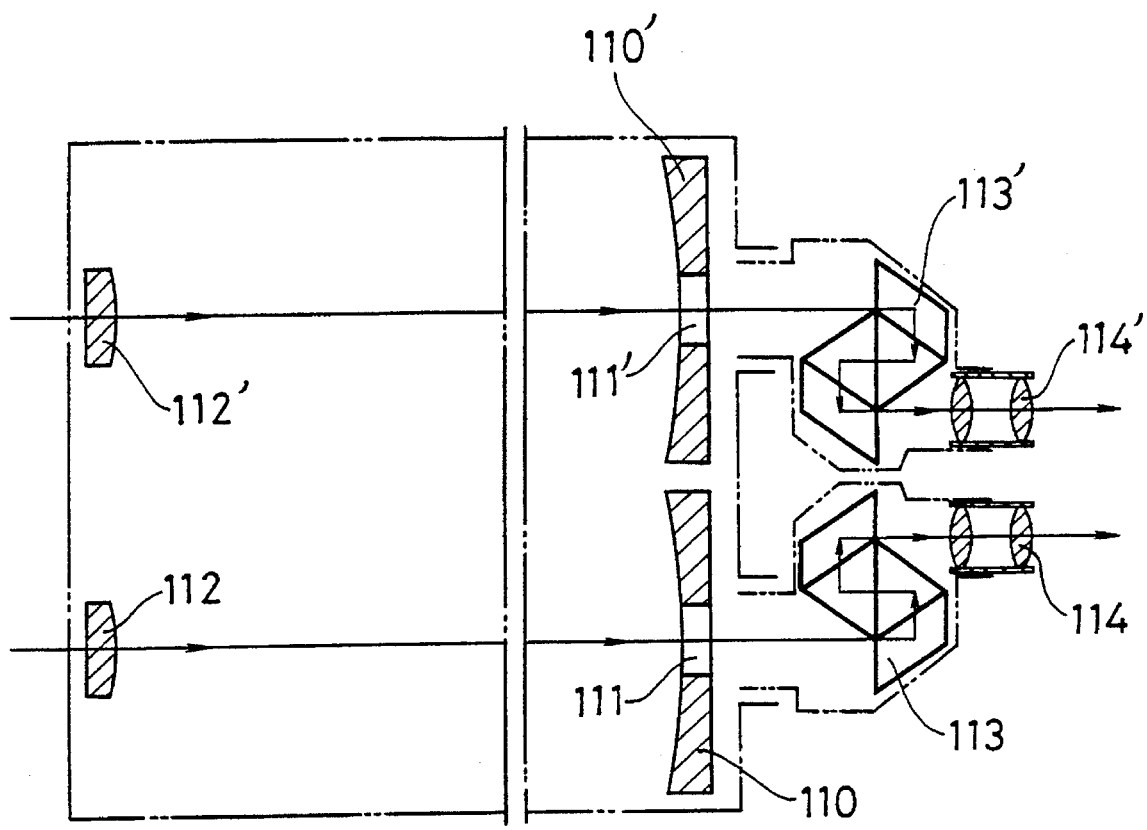
FIG. 24 is a sectional view of another conventional binocular.

In this embodiment, the angle θ (FIG. 4) between the third optical axis of the light beam reflected by the fourth mirror 18 and the first optical axis is 60°, and the angle formed between the first axis and the line of intersection defined if the third mirror 17 and the fourth mirror are brought together imaginarily (FIG. 21A and FIG. 21B), which is θ/2, is 30°. The θ and θ/2 may be 45° and 22.5°, 90° and 45° or 120° and 60°, of which the combination of 90° and 45 is shown hereinbelow as another embodiment.

FIG. 5 shows a sectional view taken along line V—V of FIG. 3. As will be apparent from this figure, the third mirror 17 and the fourth mirror 18 are arranged such that their normal lines are perpendicular to each other. Thus, a second optical axis along which the light reflected by the third mirror 17 passes is oblique to the fourth mirror 18 in the fixed barrel 13 mounted in the joint area between the right and left primary telescope tubes 10, 10'.

Figure 6:
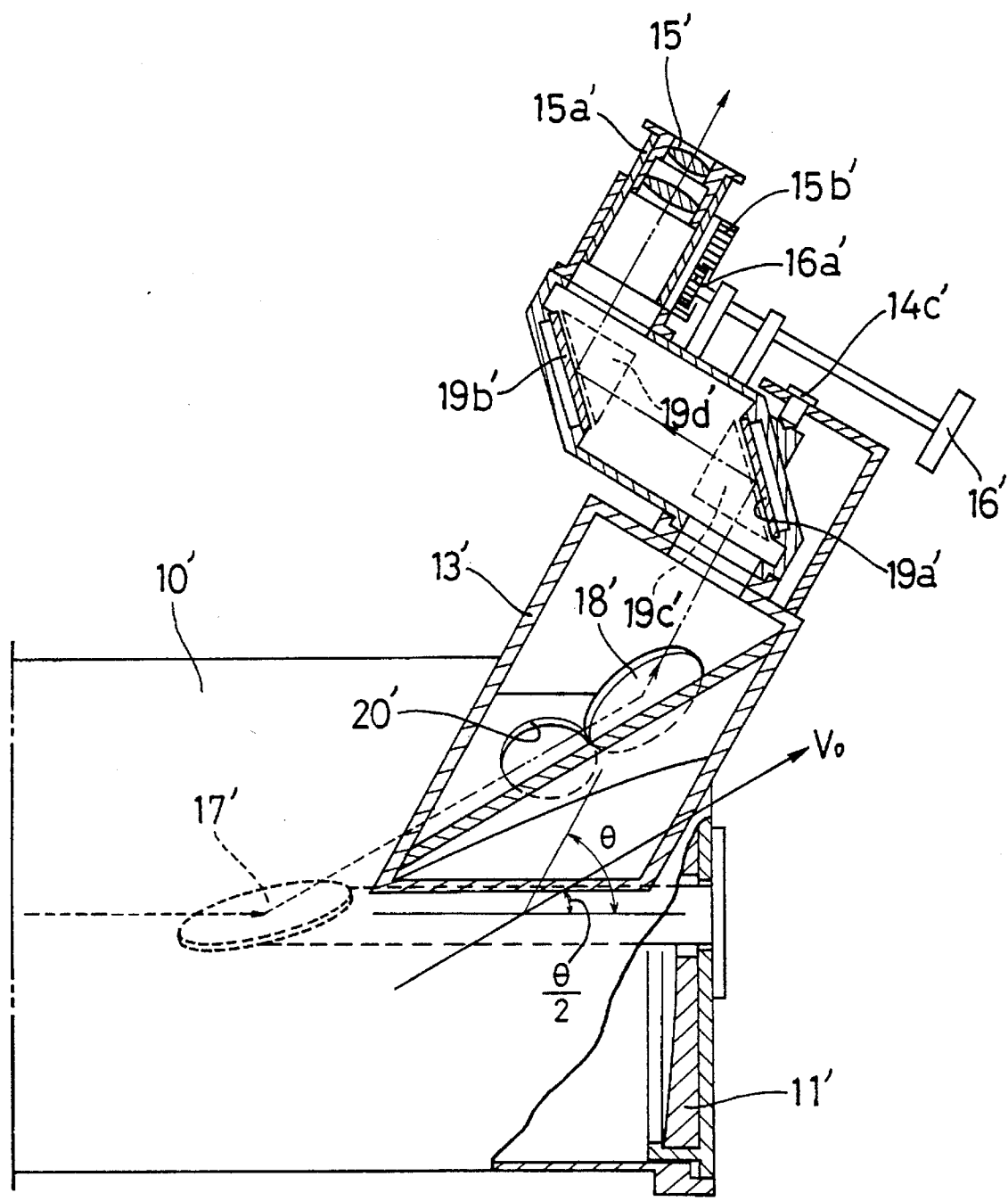
FIG. 6 is a sectional view taken along line VI—VI of FIG. 3.
Figure 7:
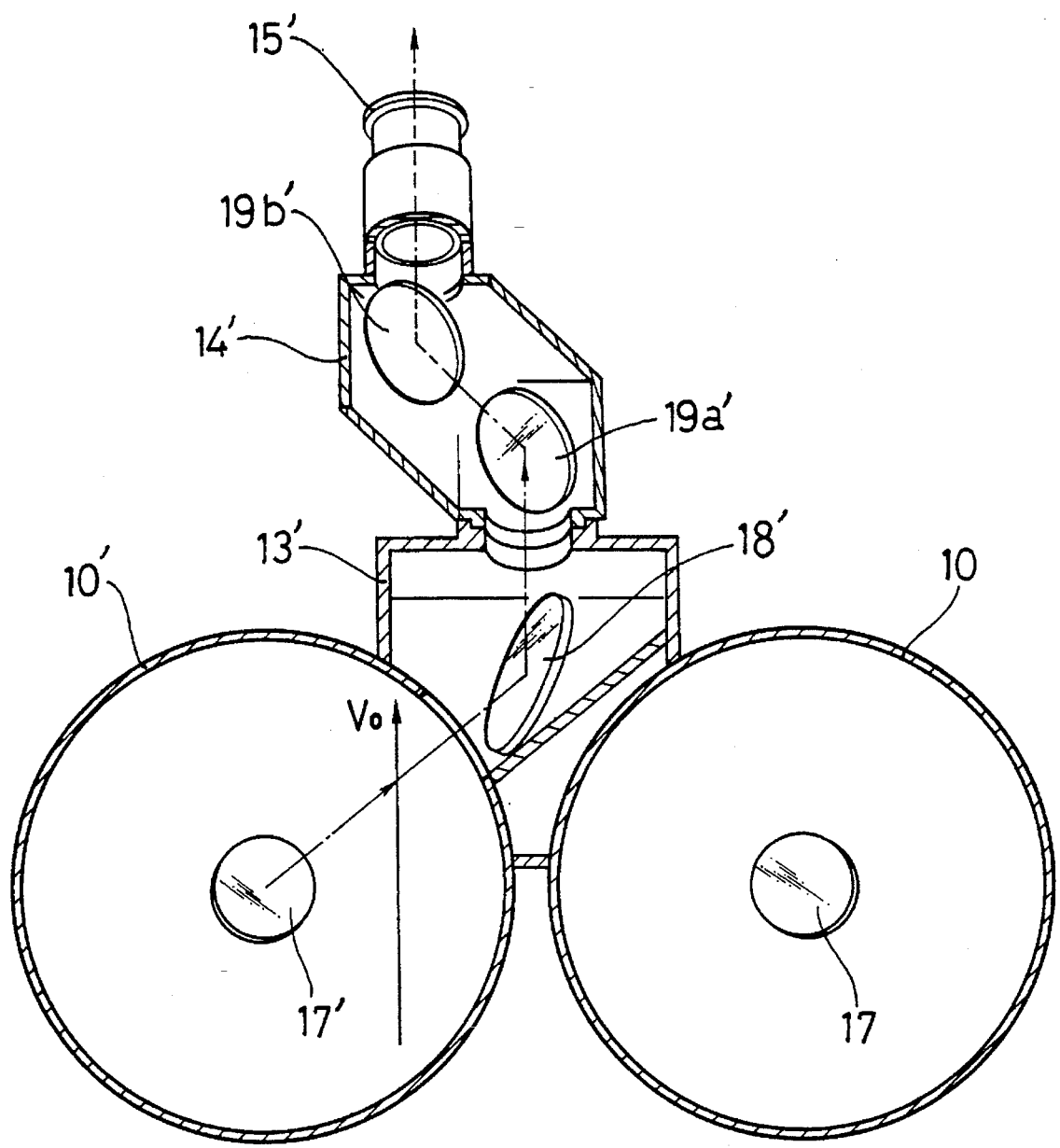
FIG. 7 is a sectional view taken along line VII—VII of FIG. 3.

FIGS. 6 and 7 are sectional views of the second primary telescope tube 10' and correspond to FIGS. 4 and 5. It is apparent from these figures that the fixed barrel 13' is in alignment with the fixed barrel 13 of FIG. 4 on the joint surface between the primary telescope tubes 10, 10'. Thus, as shown in FIG. 2, the lengths of the fixed barrels 13, 13' are different from each other to a degree depending on the angle of inclination θ (the smaller the angle θ, the larger the difference in lengths; only if the angle θ is 90°, will the barrels 13, 13' have the same length).

As will be apparent if one compares FIGS. 5 and 7, the second optical axes in the first primary telescope tube 10 and the second primary telescope tube 10' are inclined in opposite directions toward the joint area between the primary telescope tubes 10, 10'. This arrangement is employed for the following reasons.

As will be apparent from FIGS. 2 and 3, the lights are guided into the eye-pieces 15, 15' by reflecting them by the parallel mirrors in the tumblers 14, 14', which are rotatable about the third optical axes, so that an observer can keep the heights of his eyes always on the same level. Since the interpupillary distance of the human eyes is 62 mm on the average, even if the first and second primary telescope tubes 10 and 10' are inclined, observation is carried out by rotating the tumblers 14, 14' so that an observer can set the eyepieces 15, 15' to his eyes.

The centers of rotation of the tumblers 14, 14' (which coincide with the third optical axes) may be disposed on lines perpendicular to the primary optical axes of the first and second primary telescope tubes or may be disposed near lines that extend parallel to the primary optical axes on the joint surface between the first and second primary telescope tubes. In this embodiment, the latter arrangement is employed. This is the reason why the second optical axes are inclined with respect to the joint surface. The distance between the centers of rotation of the tumblers 14, 14' is preferably 10 to 15 cm taking into account the interpupillary distance of an average person and the size of the eye-pieces.

Figure 8:
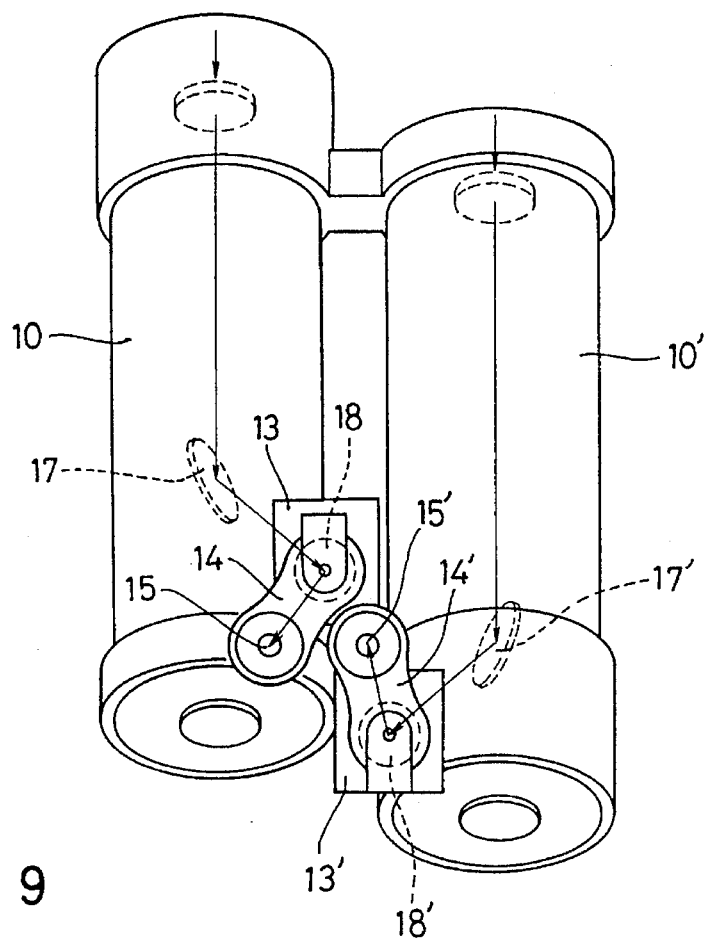
FIG. 8 is a front view of a partially modified embodiment in which long-focus eyepieces are used.

FIG. 8 shows a modified embodiment in which long-focus eye-pieces are used. The larger the eye-pieces, the larger the tumblers 14, 14' have to be. Thus, in order to prevent them from interfering against each other, the tumblers 14, 14' have their central parts constricted like iron dumbells. The third axes, which are the centers of rotation of the tumblers 14, 14', are also disposed outwardly apart from each other. In this embodiment, since the tumblers 14, 14' are large in size, long-focus, wide-angle eye-pieces 15, 15' can be used.

Now referring to FIGS. 1 and 2, description will be made of the equatorial mount of the present invention.

The equatorial mount shown comprises a pedestal 1, a polar shaft (first shaft) 2 supported obliquely by the pedestal 1, a second shaft 3 rotatably supported in a support barrel 3a coupled to the polar shaft 2, and a third shaft 4 rotatably supported in a second support barrel 4a provided at the bottom end of the support barrel 3a (see FIG. 2). Counterweights 7 are screwed onto a threaded rod 8a extending from the free end of a V-shaped crank 5 mounted on the free end of the second shaft 3 in a direction away from the steady or fixed point 3X. Another counterweight 6 is screwed onto a threaded rod 8b mounted inside of the crank 5 and extending in the same direction as the crank 5.

Let us suppose here that the equatorial mount of FIG. 2 is located in lat. 30° N. (or lat. 30° S.).

In the embodiment, the polar shaft 2 extends toward the celestial north pole (or south pole) and is rotatable following the diurnal rotation of the celestial body. The second shaft 3 is mounted in the support barrel 3a, which is secured to the end of the polar shaft 2 so as to be perpendicular to the polar shaft, and is rotatably supported by bearings 3b mounted on both ends of the support barrel 3a. Though not shown, the support barrel 3a has a clamp for unrotatably holding the second shaft 3 with respect to the support barrel 3a at a desired angle. The second support barrel 4a of the third shaft 4 is integral with the second shaft 3 at its bottom end. The second support barrel 4a is also provided with a clamp.

The two kinds of counterweights 6, 7, which are screwed onto the threaded rods 8a, 8b, connected to the crank 5, are arranged perpendicular to each other. FIG. 2 shows one counterweights 6 and two counterweight 7. But the numbers of the respective counterweights should be adjusted according to the weight (size) of the binocular reflecting telescope. Also, the counterweights 6,7 are moved along the threaded rods 8a, 8b to positions where they balance with the binocular reflecting telescope.

The binocular reflecting telescope of the embodiment is used for astronomical observation in the following manner.

As shown in FIG. 4, the light coming into the front ends of the primary telescope tubes 10, 10' is reflected by the primary mirrors 11, 11' and the secondary mirrors 12, 12'. The image formed by the thus reflected light is inverted. But the light collected and converged by the secondary mirrors is reflected by an erect image creating means comprising the third mirror 17 disposed on the first optical axis and the fourth mirror 18 on the second optical axis. The light thus reflected produces an erect image.

An erect image is created by setting the value θ at 60° in the embodiment.

As shown in FIGS. 4 and 5, the light beam reflected by the secondary mirror 12 is propagated along the first optical axis and reflected by the third mirror 17, whose normal line is denoted Q3, the incident angle and the reflecting angle both being 69°. The light beam is then propagated along the second optical axis, passes through an elliptic hole 20 formed in the primary telescope tube 10, and impinges on the fourth mirror 18 having a normal line Q4 and supported by the support plate 18a. The light beam is reflected by the fourth mirror 18 at both the incident angle and the reflecting angle of 69° and is now propagated upwards along the third optical axis, which forms an angle of 60° with respect to the primary axis.

The light converted into an erect image is reflected by the pair of parallel mirrors 19a, 19b in the tumblers 14, 14' and guided into the eye-pieces 15, 15'. An observer can see the light image thus formed by turning the focusing dials 16, 16'.

An observer manually controls the right and left primary telescope tubes 10, 10' and the tumblers 14, 14' so as to direct the telescope at a target object in the celestial globe. Of course, a motor may be coupled to each of the rotary shafts to control the telescope automatically, instead of manually, with a computer.

Figure 9:
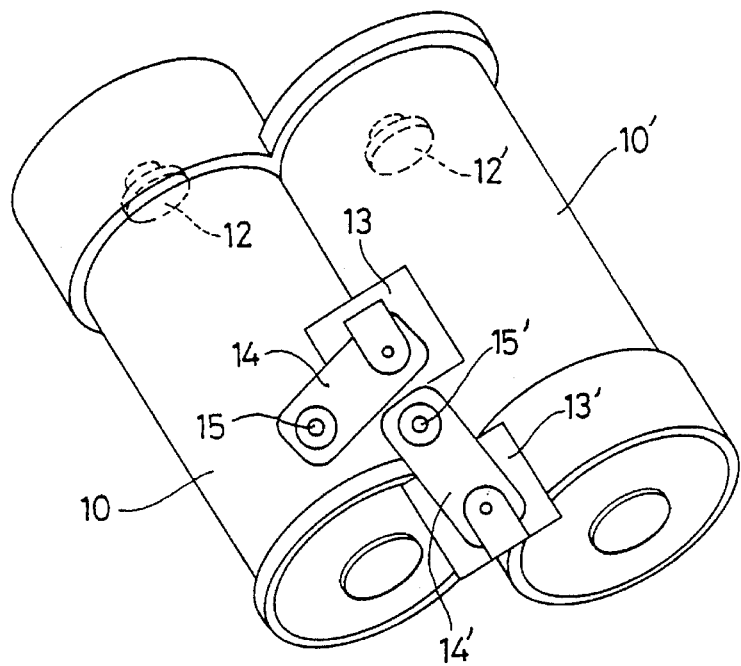
FIG. 9 is a view illustrating the operation of the rotatable tumblers.

In the state shown in FIG. 9, the telescope is mounted on the equatorial mount so that its primary telescope tubes 10, 10' are inclined by 30° with respect to the vertical line. In the tumblers of the telescope shown, no focusing device is mounted. Instead of providing such focusing devices in the tumblers, motors may be mounted on the secondary mirrors in the primary telescope tubes so as to adjust the focus by moving the secondary lenses back and forth in a straight line.

If only the primary telescope tubes 10, 10' are inclined following the movement of the celestial globe while not rotating the tumblers 14, 14' from the position shown in FIG. 3, the eye-pieces 15, 15' will be moved to different heights from each other, so that an observer will be forced to incline his head.

The telescope of the embodiment is free of this problem because the eye-pieces 15, 15' can be rotated independently of each other by the respective tumblers 14, 14'. Namely, the eye-pieces 15, 15' can be moved to positions level with each other as shown in FIG. 3 by manually rotating the tumblers. Thus, an observer does not have to incline his head when making telescopic observations.

Figure 10:
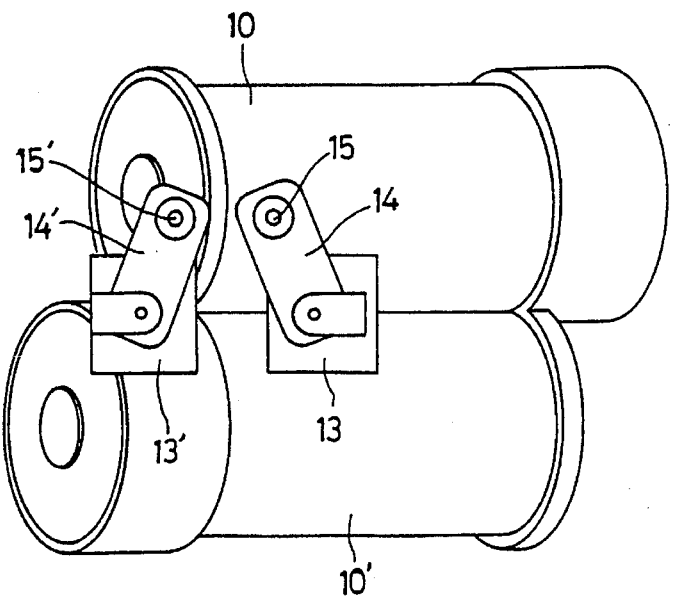
FIG. 10 is another view of the rotatable tumblers of FIG. 9 with the primary telescope tubes turned to a horizontal position.

FIG. 10 shows a state in which the primary telescope tubes 10, 10' are turned to their horizontal position opposite to the position shown in FIG. 9. Any more detailed description is omitted.

The binocular reflecting telescope of the preferred embodiment is mounted on the equatorial mount shown in FIGS. 1 and 2 and used for astronomic observation in the following manner.

Figure 11:
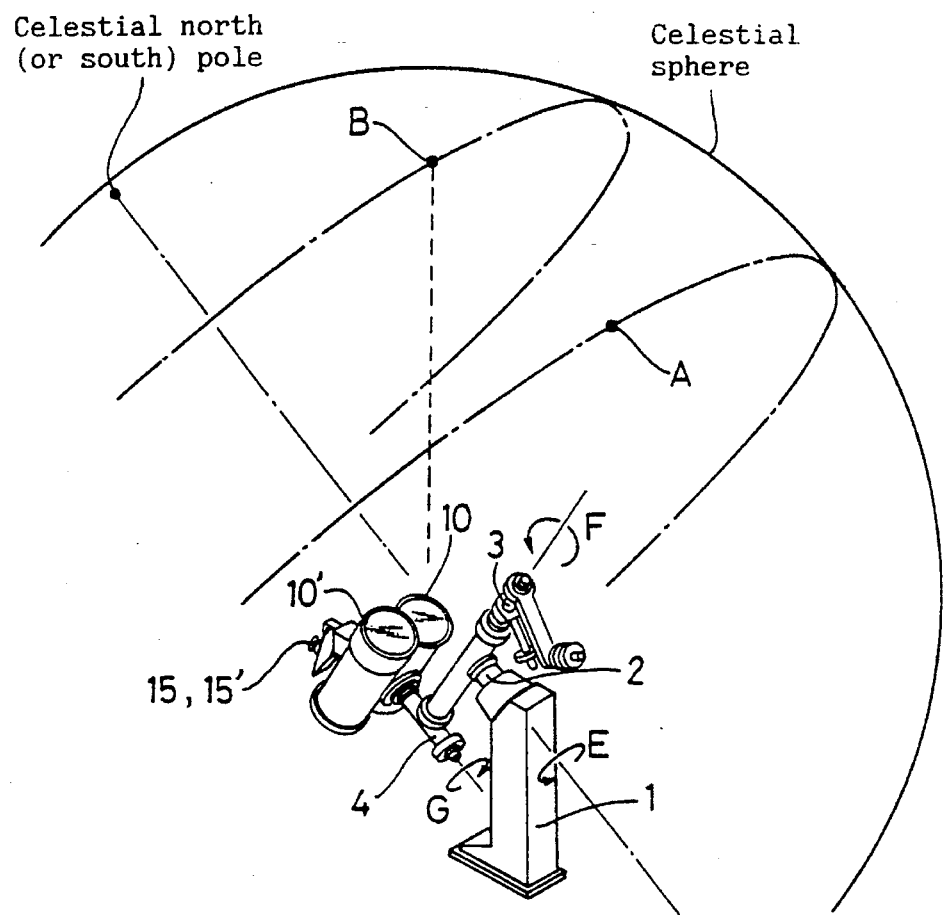
FIG. 11 is a view explaining how astronomical observation is made.

As shown in FIG. 11, the polar shaft 2 of the equatorial mount shown in FIG. 2 is directed toward e.g. the celestial north pole (or south pole) to observe stars that make diurnal rotations as shown by locus A which extends along the celestial equator.

The equatorial mount shown in FIG. 2 has a greater degree of freedom of rotation compared with a German-style equatorial mount, which has a right-ascention shaft and a declination shaft, because it has the third shaft 4 in addition to the above two shafts.

Thus, a celestial body that passes the locus A shown in FIG. 11 can be observed simply by turning only the polar shaft 2. But a celetrical body such as one that follows the locus B will not come within the range of telescope simply by turning the polar shaft 2.

In order to observe a celestial body that makes dirunal rotation passing the zenith such as locus B, the polar shaft 2 is turned by 90° in the direction of diurnal rotation (the direction of arrow E in FIG. 11), the second shaft 3 is then turned by 30° in the direction of arrow F, and finally the third shaft 4 is turned by 90° in the direction of arrow G. In this state, the primary telescope tubes 10, 10' are trained on the zenith while the eye-pieces 15, 15' are kept level with each other.

When an observer put his eyes on the eye-pieces 15, 15' kept level with each other, the primary telescope tubes 10, 10' will rotate together with the polar shaft 2, which is driven by a diurnal rotation tracking device, until the target object comes into view.

The equatorial mount used for astronomical observation has, as shown in FIG. 2, a threaded rod 8a mounted on the free end of the V-shaped crank 5 and extending along an extension line aligned with the line connecting the center of gravity 9a of the telescope and the steady point 3X. Counterweights 7 are screwed onto the threaded rod 8a. Another threaded rod 8b is mounted inside the crank 5 so as to extend parallel thereto. Another counterweight 6 is screwed on the rod 8b. In order to keep the counterweights 6 and 7 in a balanced state about the steady point 3X, the center of gravity of the combined mass of counterweights 6 and 7 has to be disposed on an equilibrium straight line 9b passing the steady point 3X and the center of gravity of 9a of the telescope.

By adding counterweights 6 and 7 only to the crank 5, the total weight of counterweights used can be reduced by about half compared with the case where weights are attached to the bottom end of the third shaft (K in FIG. 2).

Figure 12:
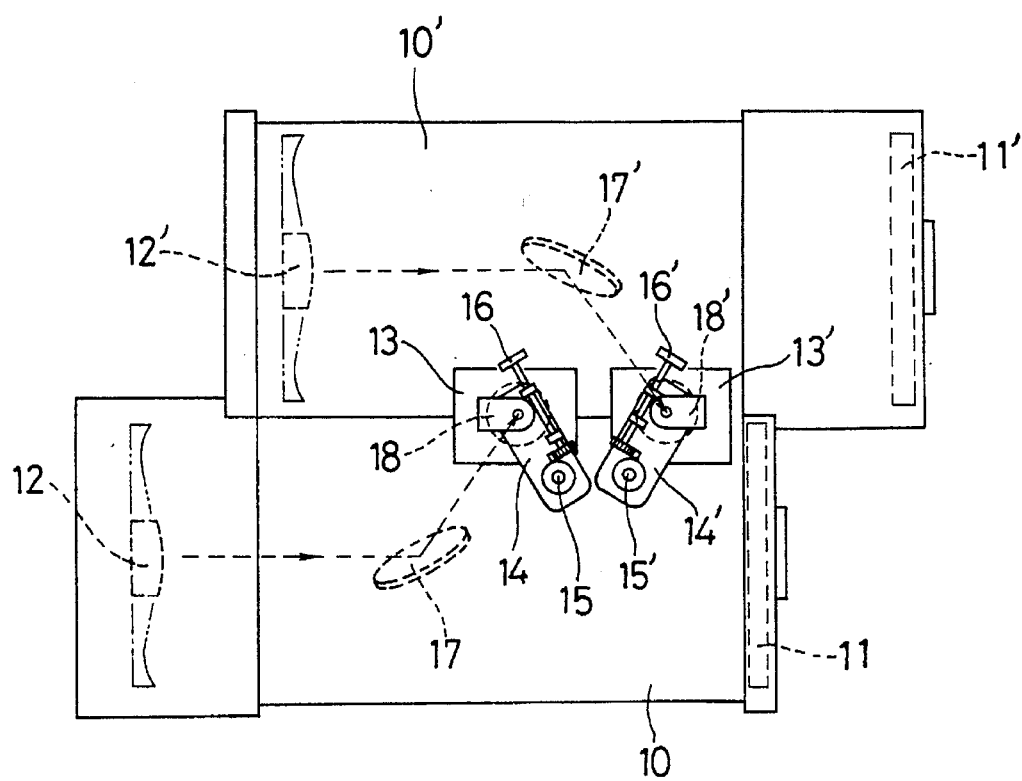
FIG. 12 is a schematic view of the second embodiment.

FIG. 12 shows the second embodiment, which is basically the same as the first embodiment. But in this embodiment, the value θ is 90°, so that the fixed barrels 13, 13' are perpendicular to the first optical axis and are of the same length. The same functional members are represented by the same numerals and their description is omitted.

Figure 13:
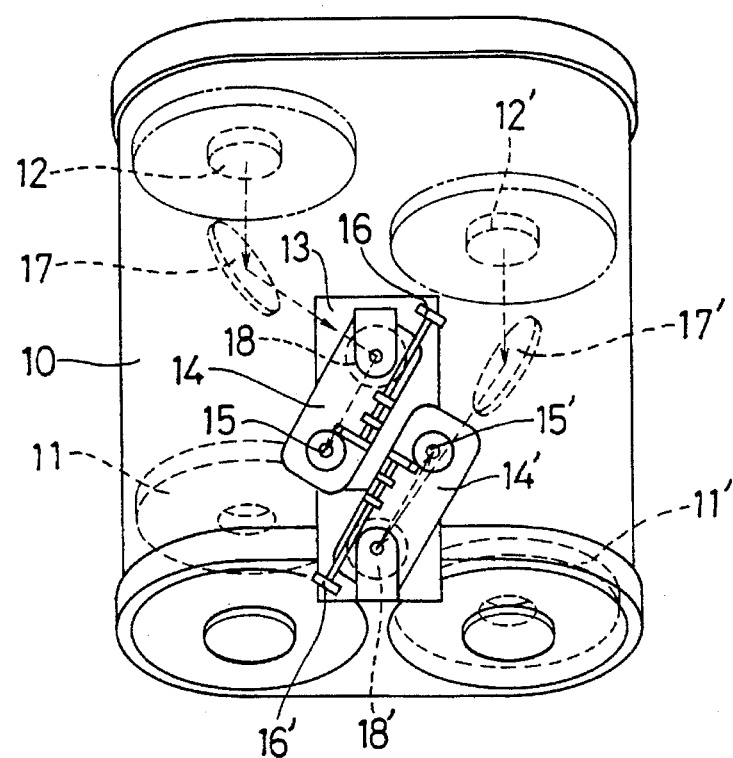
FIG. 13 is a schematic view of the third embodiment.

The embodiment shown in FIG. 13 is also basically the same as the first embodiment. Only difference is that the primary telescope tubes are integral with each other. In this embodiment, too, the same functional members are denoted by the same numerals and their description is omitted.

Figure 16:
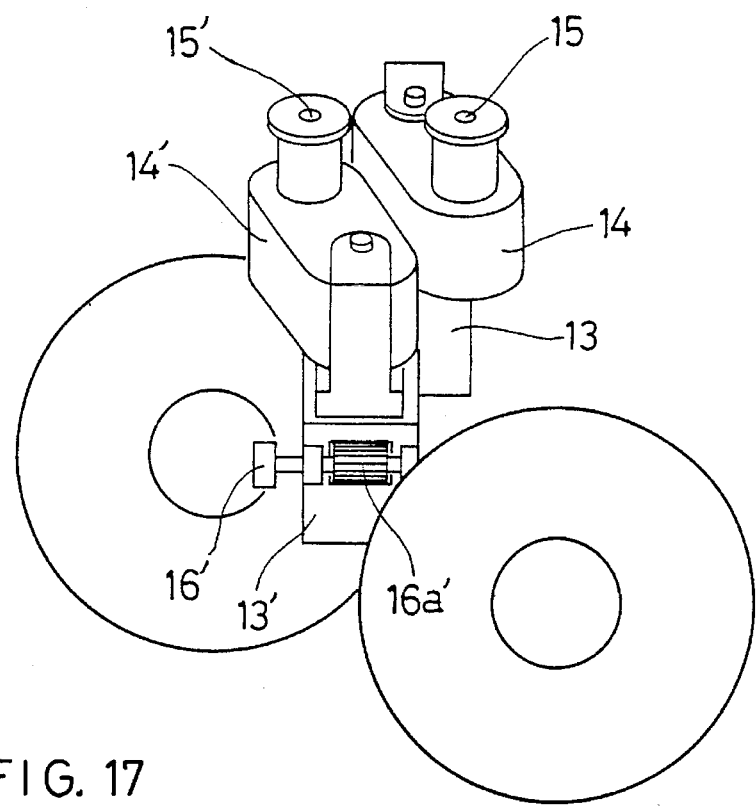
FIG. 16 is a front view of the embodiment illustrated in FIG. 14.
Figure 14:
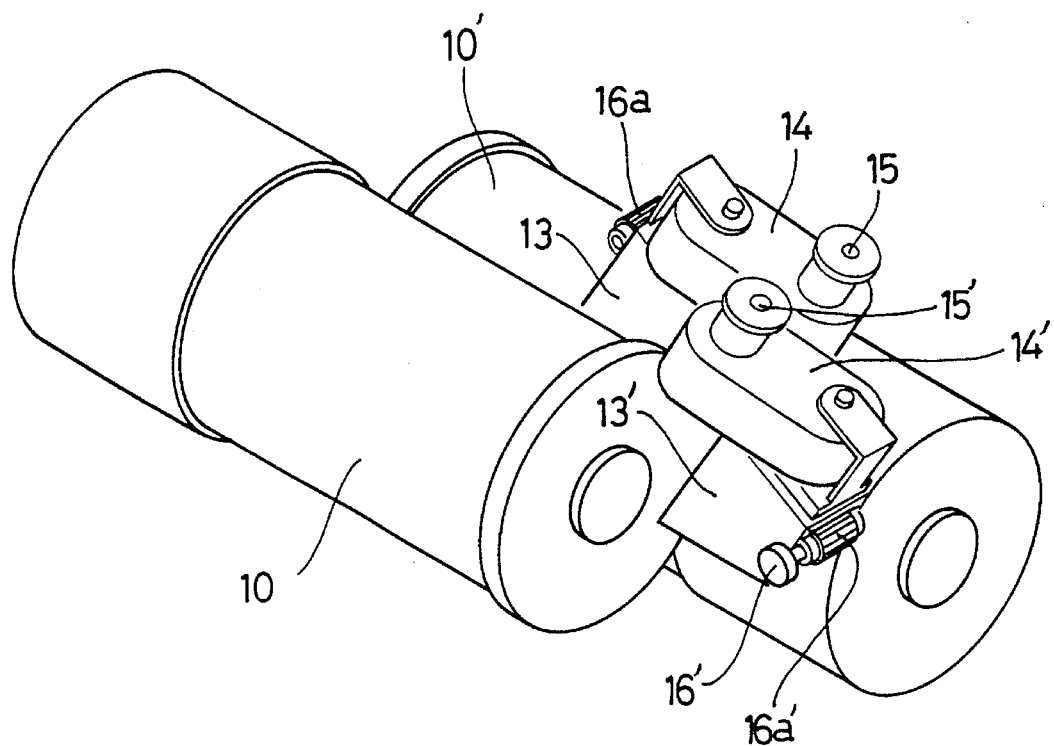
FIG. 14 is a schematic view of the fourth embodiment.
Figure 15:
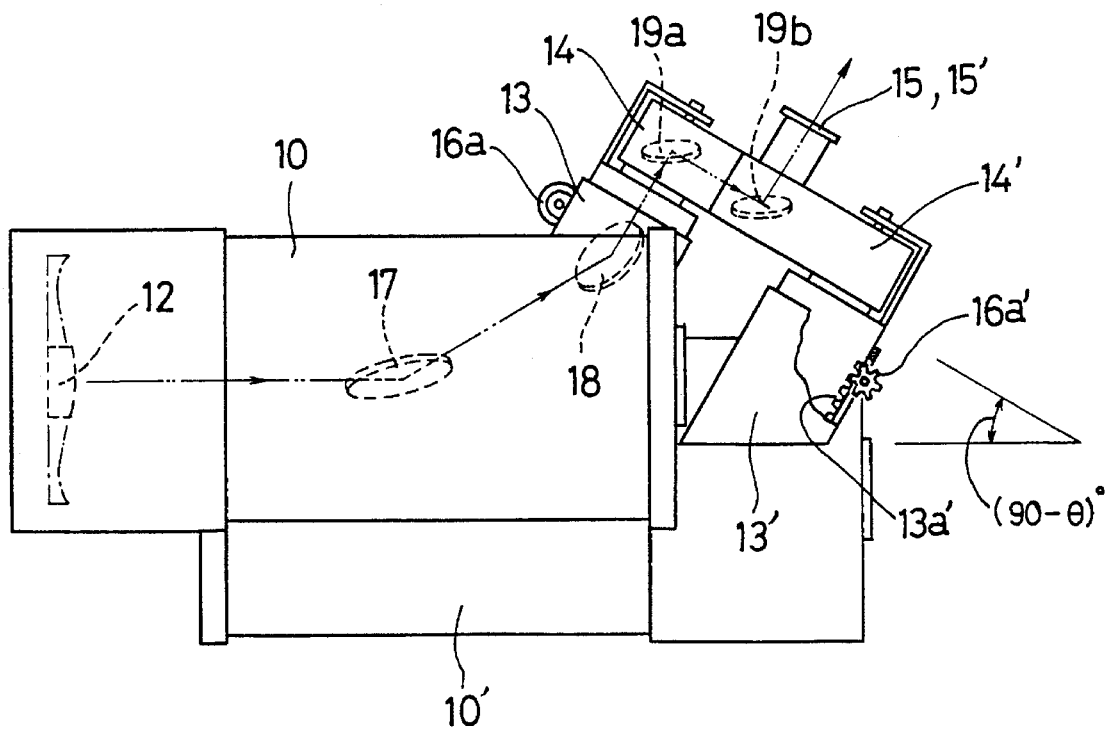
FIG. 15 is a side view of the embodiment illustrated in FIG. 14.

FIGS. 14–16 show the fourth embodiment, which is also basically the same as the first embodiment and differs only in that the first primary telescope tube is raised so as to form an angle (90–θ)° as shown in FIG. 15 and coupled in this state to the second primary telescope tubes. With this arrangement, fixed barrels of the same length can be used. In the first embodiment, the fixed barrels 13, 13' have different lengths from each other.

Also, in this embodiment, the focusing mechanism for the eye-pieces 15, 15' is slightly different from those of the first embodiment. Namely, in this embodiment, the focusing mechanism, provided on the fixed barrels, comprises a dial 16, pinion 16a and rack 13a and is used to move the tumblers 14, 14' up and down with respect to the fixed barrels 13, 13', instead of moving the eye-pieces 15, 15' themselves-up and down with respect to the tumblers 14, 14'.

In this embodiment, the central axes of the fixed barrels 13, 13' (third optical axes) are slightly offset from the joint surface between the primary telescope tubes 10, 10', since the fixed barrels 13, 13' have to be mounted on the primary telescope tubes (FIG. 16). Otherwise, this embodiment is basically the same in structure as the first embodiment. Thus, the same functional elements are denoted by the same reference numbers and their description is omitted.

Figure 17:
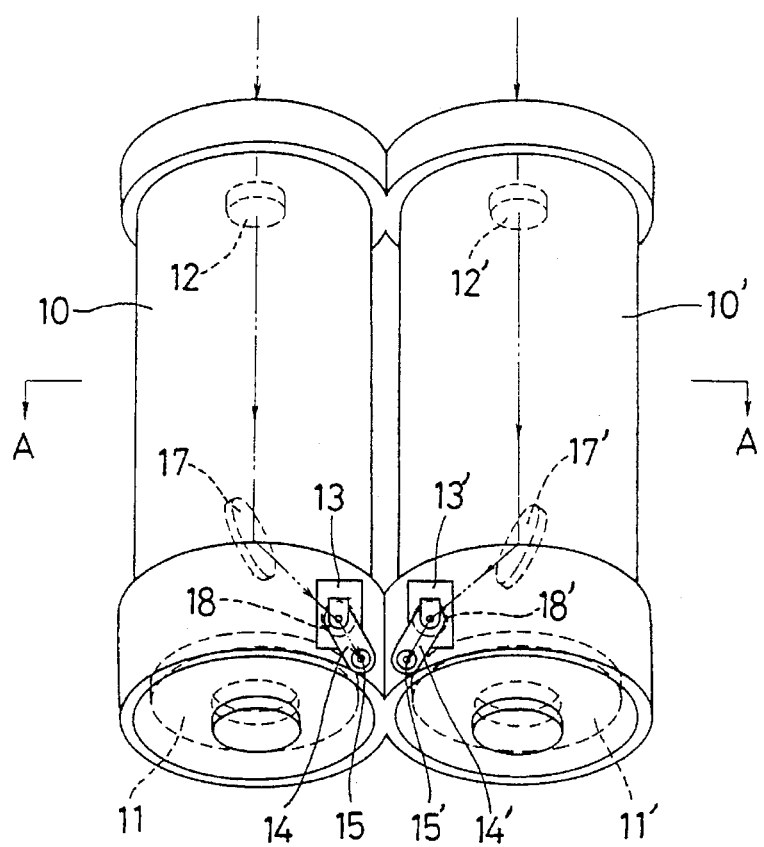
FIG. 17 is a front view of the fifth embodiment.
Figure 18:
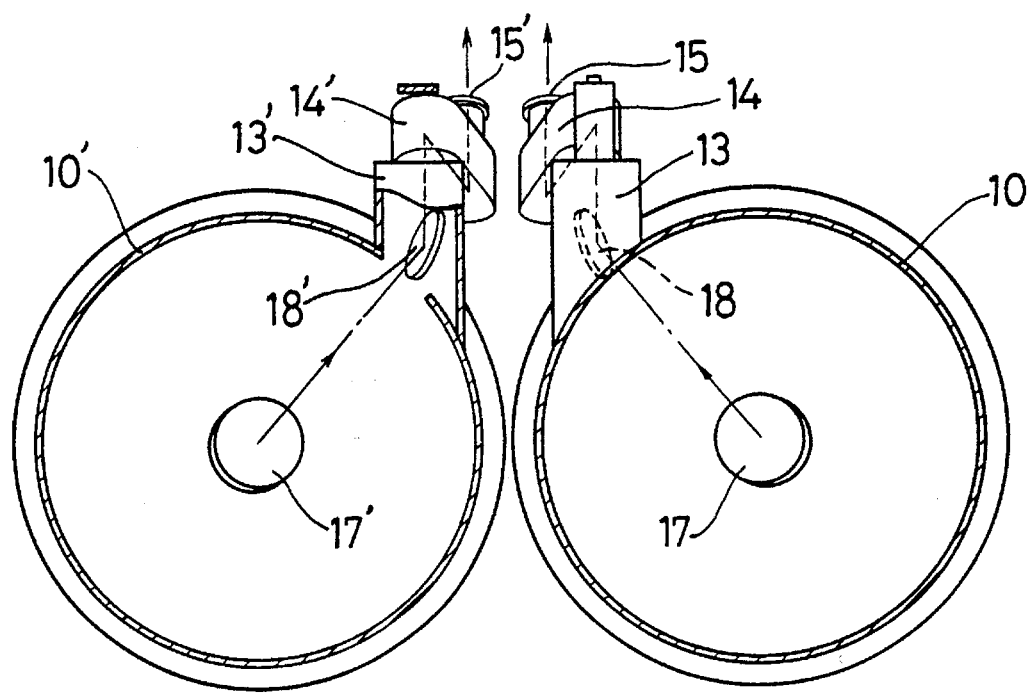
FIG. 18 is a sectional view taken along line A—A of FIG. 17.

FIGS. 17 and 18 show the fifth embodiment, which is different rather substantially from the other embodiments, in that the third optical axes that pass the fixed barrels 13, 13' are spaced apart a predetermined distance from each other in a direction perpendicular to the primary optical axes of the first and second primary telescope tubes 10, 10' and that the first and second primary telescope tubes 10 and 10' are joined together so as not to be longitudinally displaced from each other but have their bottoms on a line.

Thus, like the other embodiments, the fixed barrels 13, 13' are mounted on the first and second primary telescope tubes 10 and 10' so that the angle θ between the third optical axis and the first optical axis and the angle θ/2 between the line of intersection formed if the third and fourth mirrors were overlapped and the first optical axis will be 60° and 30°, respectively, as viewed from the same direction as in FIG. 4.

Figure 19:
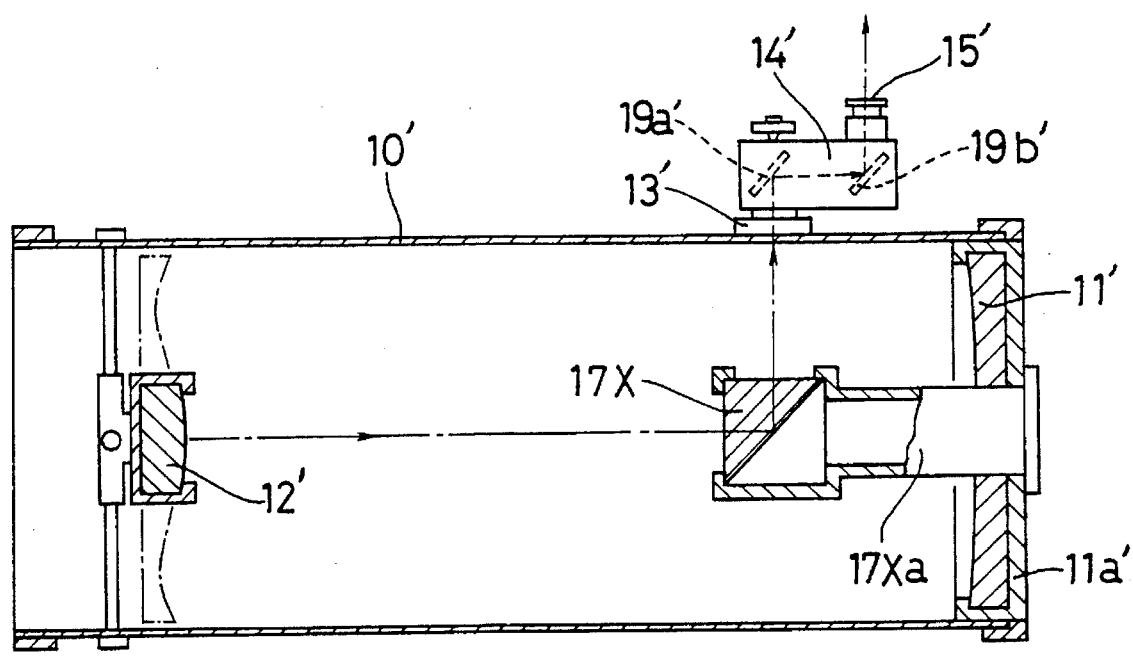
FIG. 19 is a vertical sectional view of the sixth embodiment.
Figure 20:
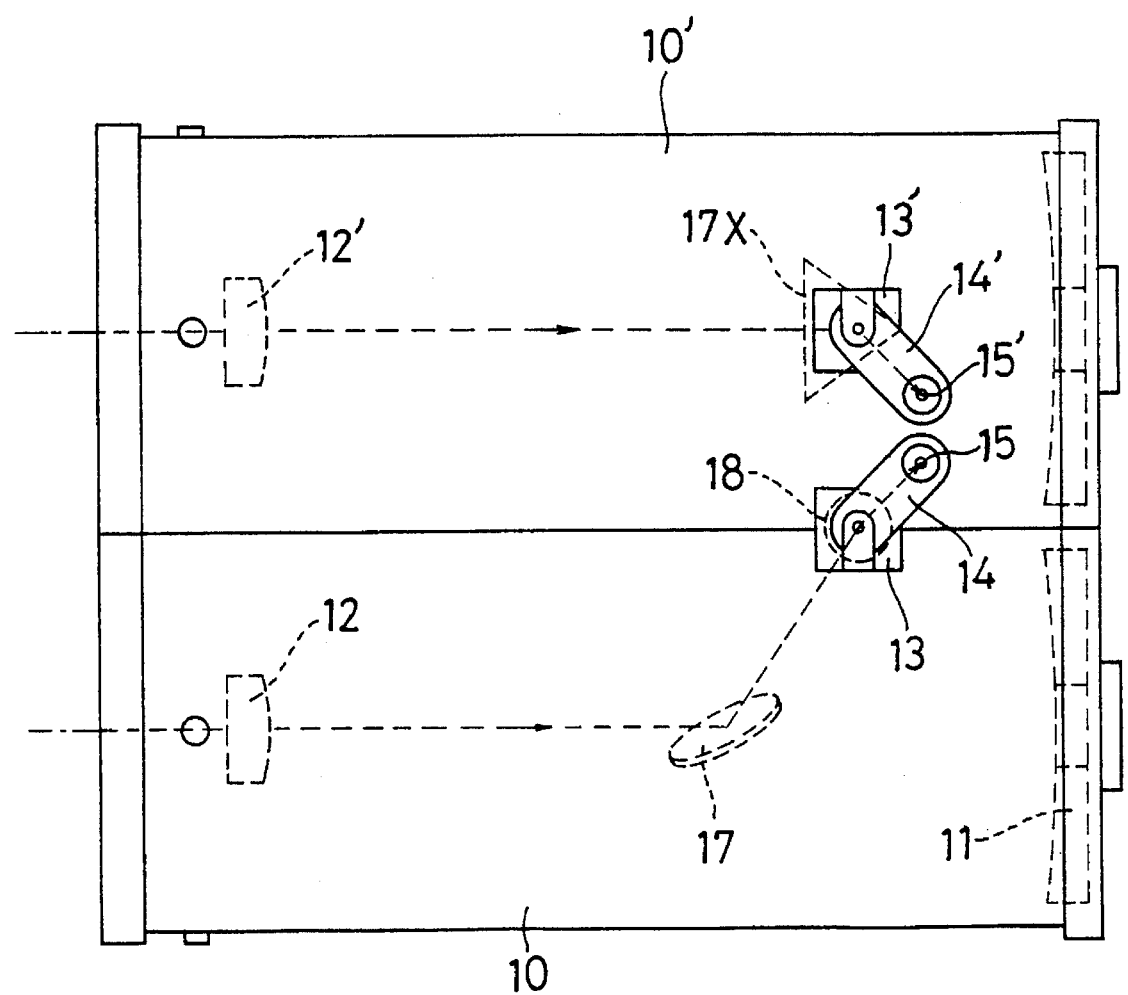
FIG. 20 is a plan view of the embodiment illustrated in FIG. 19.

FIGS. 19 and 20 show the sixth embodiment, which is advantageously applicable to a relatively small-aperture telescope. In this embodiment, the structure on the side of the first primary telescope tube 10 is substantially the same as that of the second embodiment (i.e. θ=90°) but that on the side of the second primary telescope tube 10' has a completely different structure. FIG. 19 shows a section of the second primary telescope tube 10' shown in FIG. 20, taken along the primary optical axis. This arrangement is different from the other arrangements in that a roof (Amici) prism 17X is used as an erect image forming means in place of the third and fourth plane mirrors 17, 18.

The roof (Amici) prism 17X is supported on a support member 17Xa disposed along the primary optical axis. The light of an inverted image, reflected by the secondary mirror 12', is converted to an erect image by the roof (Amici) prism 17X and emitted in the normal direction. It is then guided to the eye-piece 15' by a pair of parallel mirrors 19'a, 19'b in the tumbler 14'.

The same image as in the other embodiments can be viewed through the eye-pieces 15, 15'.

In the above embodiments, the angle θ was 60° or 90°. But the angle θ can be changed within the range of 45°–120°.

What is claimed is:

1. An equatorial mount comprising:

a pedestal;

a first shaft rotatably supported on said pedestal so as to extend therefrom at an angle;

a first support barrel fixed to said first shaft, wherein said support barrel is perpendicularly oriented relative to said first shaft;

a second shaft having a first end and a second end, wherein said second shaft is rotatably supported in said support barrel;

a second support barrel fixed to said first end of said second shaft, wherein said second support barrel is perpendicularly support barrel 3a. Though not shown, the support barrel 3a *oriented relative to said second shaft;* a third shaft rotatably supported in said second support barrel, wherein said third shaft includes a free end adapted to support a telescope;

a crank mounted on said second end of said second shaft; and a plurality of counterweights coupled to said crank to counter balance a telescope.

2. The equatorial mount as claimed in claim 1, wherein said first shaft extends toward the celestial north pole.

3. The equatorial mount as claimed in claim 1, wherein said plurality of counterweights are positioned along a line defined by a telescope center of gravity and the intersection of the longitudinal axes of said first support barrel and said first shaft.

* * * * *